Dec. 25, 1962    F. J. L. DORL    3,070,412
TAPERED BALL BEARING
Filed Dec. 1, 1961

INVENTOR
FRANCIS J. L. DORL
BY
ATTORNEYS 3,070,412
TAPERED BALL BEARING
Francis J. L. Dorl, 17 Mountain Ave., Summit, N.J.
Filed Dec. 1, 1961, Ser. No. 156,401
2 Claims. (Cl. 308—174)

The invention relates to a tapered ball bearing which can withstand radial as well as axial or thrust loads at the same time with little friction.

At the present time, tapered roller bearings are used, where the bearings are to be subjected to radial and axial loads. In any tapered bearing the conical lines of the inner race and the outer race and the lines of the tapered rollers must meet at one point in the center of the shaft of the bearing called the apex point.

The tapered roller bearings have inherent defects which limit their advantageous use. The rollers abut against a retaining flange which is usually an integral part of the inner race. The flange prevents the rollers from slipping out of the bearings. However, when pressure is applied to the tapered roller bearing, the rollers are pressed hard against the flange and serious sliding or bouncing or bubbling friction occurs due to the rotation of the flange in one direction and the rollers in a counter direction. The friction not only causes wear and tear on the rollers and the retaining flange; it also tends to deviate the rollers from the apex point.

Another structural defect in a tapered roller bearing is due to the fact that the tapered rollers themselves are rigid rods of comparatively long length. In order for the bearing to function properly, the rollers must be maintained in line with the apex point. If one end of the roller is moved away from its fixed position, there is an angular deflection of the roller from the apex point which creates wear on the rollers. Attempts have been made to machine the cage which holds the rollers during assembly so that it will hold the rollers in line with the apex point during use, but this is not economically feasible.

One of the prior art attempts to overcome the deficiencies of the tapered rollers bearings is illustrated by U.S. Patent No. 1,671,372, by Leedham. The Leedham bearing consists of a plurality of rows of balls of decreasing size running in grooved tracks on the inner cone. The grooved tracks are placed closed together so that the balls in one groove lie partly between the balls in the adjacent groove. The Leedham bearings do not absorb any inward movement caused by the pressure of the thrust loads and are not satisfactory.

It is an object of the invention to provide a tapered ball bearing capable of withstanding axial and thrust loads.

It is another object of the invention to provide a tapered ball bearing which avoids the defects of a tapered roller bearing.

These and other objects and advantages of the invention will become obvious from the following detailed description.

Referring to the drawings, which are illustrative of various preferred embodiments of the invention:

Figure 1:
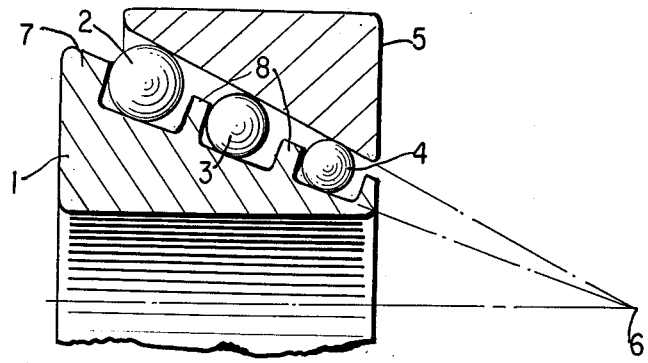
FIG. 1 is a sectional view through an upper portion of a tapered ball bearing with three rows of balls of diminishing size.

In the embodiment illustrated by FIG. 1, the inner cone of the bearing is indicated at 1, the balls of diminishing size are indicated at 2, 3 and 4 and the outer race or cup is indicated at 5. The apex point of the bearing is at 6. The inner race is provided with a retaining flange 7 to hold the first row of the largest balls within the bearing and to act as a thrust flange when an axial load is applied to the bearing. Between each row of balls, there is an additional flange 8 on the inner cone to act as a thrust flange for each row of balls and to form a flat track for the balls. Each retaining flange has a height greater than one-half of the diameter of the ball for which it acts as a flange so that a tangential point of contact is made between the ball and the flange.

Each space between the flanges is greater than the diameter of the ball which is in the space so that the balls may move backward (up the inclined race surface). This allows for inward movement caused by the pressure of thrust loads and each row of balls with be in position to absorb the thrust loads.

Figure 2:
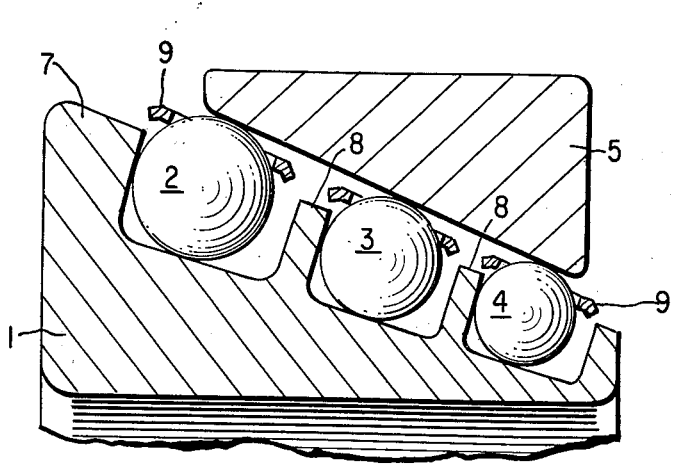
FIG. 2 is a sectional view through an upper portion of a tapered ball bearing in which the balls of diminishing size are held by a cage for easy assembly.

FIG. 2 illustrates a modification of the embodiment of FIG. 1 in which the rows of balls are held by a cage 9 for ease of assembly. The openings in the cage should be less than the diameter of the balls and may be made in a conventional manner.

The balls may be made of any suitable material but are preferably made out of hardened steel. The flanges can have slight grooves in the surfaces at the tangential point of contact in order to provide a longer supporting surface for the balls, if desired.

While the bearing illustrated in FIGS. 1 and 2 shows three rolls of balls, two or more rows may be used depending upon the desired load capacity of the bearing. The bearing is able to bear a heavier load as the number of rows of balls is increased. To simplify the manufacture of the bearings, they may be made in a plurality of sections, each with only one row of balls. It is necessary to be sure that the conical lines of the sections remain true to the apex point.

The tapered ball bearing of the invention avoids the fraction and alignment problems of the tapered roller bearing.

While the preferred forms of embodiments have been illustrated, various modification of the invention may be made without departing from the spirit or scope thereof and it is to be understood that the invention is to be limited only as defined in the appended claims.

I claim:

1. A tapered ball bearing comprising an inner cone having an end thrust flange and at least one other flange to provide a plurality of flat tracks on the inner cone, a plurality of rows of balls of decreasing diameter in the flat tracks, which balls have a diameter less than the width of the track in which they rest, and an outer bearing cup.

2. A tapered ball bearing comprising an inner cone having an end thrust flange and at least one other flange to provide a plurality of flat tracks on the inner cone, a plurality of rows of balls of decreasing diameter in the flat tracks, which balls have a diameter less than the width of the track in which they rest, and a cage to hold the balls, and an outer bearing cup.

References Cited in the file of this patent

UNITED STATES PATENTS

| | | |
|---|---|---|
| 1,645,345 | Okner | Oct. 11, 1927 |
| 1,671,372 | Leedham | May 29, 1928 |
| 2,019,464 | Riblet | Oct. 29, 1935 |
| 2,523,238 | Tarbutton | Sept. 19, 1956 |